NONRECIPROCAL WAVE TRANSLATING DEVICE

Filed Oct. 30, 1959 6 Sheets-Sheet 1

INVENTORS J. M. SIPRESS
F. J. WITT
BY Sylvan Sherman
ATTORNEY

INVENTORS J. M. SIPRESS
F. J. WITT
BY
Sylvan Sherman
ATTORNEY

NONRECIPROCAL WAVE TRANSLATING DEVICE

Filed Oct. 30, 1959 6 Sheets-Sheet 3

INVENTORS J. M. SIPRESS
F. J. WITT
BY
Sylvan Sherman
ATTORNEY

INVENTORS J. M. SIPRESS
F. J. WITT
BY
Sylvan Sherman
ATTORNEY

Feb. 4, 1964 J. M. SIPRESS ETAL 3,120,645

NONRECIPROCAL WAVE TRANSLATING DEVICE

Filed Oct. 30, 1959 6 Sheets-Sheet 5

INVENTORS J. M. SIPRESS
F. J. WITT
BY
Sylvan Sherman
ATTORNEY

NONRECIPROCAL WAVE TRANSLATING DEVICE

Filed Oct. 30, 1959 6 Sheets-Sheet 6

INVENTORS J. M. SIPRESS
F. J. WITT
BY
Sylvan Sherman
ATTORNEY 3,120,645

NONRECIPROCAL WAVE TRANSLATING DEVICE

Jack M. Sipress and Francis J. Witt, Summit, N.J., assignors to Bell Telephone Laboratories, Incorporated, New York, N.Y., a corporation of New York Filed Oct. 30, 1959, Ser. No. 849,843
10 Claims. (Cl. 330—12)

This invention relates to nonreciprocal signal translating networks and in particular to gyrators.

A gyrator is defined as a four-terminal element which is described by the following pair of equations (see FIG. 1):

$$E_1 = +Z_1 I_2$$
$$E_2 = -Z_2 I_1$$

Since the coefficients of the curretn terms are of opposite sign, and, in general, are unequal, the gyrator violates the principle of reciprocity. This is in marked contrast to networks composed of the usual electrical circuit elements such as resistors, capacitors, inductors and transformers, in that such elements, individually, and in combination, satisfy the reciprocity theorem.

In simple terms, the reciprocity theorem states that if a current source is inserted at one point in a network and if the voltage produced thereby at some other part of the network is measured, the ratio of the measured voltage to the applied current, called the transfer impedance, will be the same if the relative positions of the driving source and the measured effect are reversed.

In the gyrator, however, the transfer impedance for one direction of propagation differs in sign from that for propagation in the reverse direction and their magnitudes may, in general, be unequal.

One very important application of the gyrator is as an impedance inverter, i.e., if an impedance Z is connected between one pair of terminals, the impedance measured at the other terminals is proportional to $1/Z$. Thus, a capacitor, with capacitance C, may be made to appear as an inductor whose inductance is proportional to C.

Network synthesis, in the past, has been based upon the existence of four basic circuit elements, the capacitor, the resistor, the inductor and the ideal transformer. It is apparent that the introduction of a fifth circuit element, such as a gyrator, leads to considerably improved solutions for many network problems.

Gyrators have been realized, in the past, by means of mechanically coupled piezoelectric and electro-magnetic transducers, by means of electromagnetic coupling through Hall effect materials, and most recently, by means of electromagnetic coupling to gyromagnetic materials at microwave frequencies.

It is an object of this invention to produce gyrator action at frequencies at which lumped parameter circuit components are used.

It is a further object of this invention that such gyrator networks be broad-band, stable and simple in construction and operation.

In accordance with the invention, gyrator action is produced by means of a combination of active and passive circuit components. In particular, one embodiment of the invention comprises two quasi-series connected paths, one of which includes, in cascade, a current amplifier, a current-to-voltage transducer, a phase inverter and a voltage amplifier. The second path includes, in cascade, a current amplifier, a current-to-voltage transducer, and a voltage amplifier.

The circuit functions, described above may be realized using vacuum tubes, transistors or other similar active elements. A transistorized embodiment of the invention is shown and means are suggested for simplifying the basic circuit.

It should be noted that in the various networks to be described in greater detail hereinafter, gyrator action is achieved through the use of special circuit configurations, rather than as a result of the particular adjustment of one or more parameters of the circuit. In the prior art class of networks, the operation of the circuit as a gyrator is directly a function of these specially adjusted parameters and, as a result, the circuit is quite sensitive to variations in environment, and aging of the particular elements of which the given parameters are descriptive.

The performance of a gyrator, in accordance with the invention, on the other hand, is substantially independent of variations in the parameters of the active circuit elements, i.e., transistors or vacuum tubes. Consequently, the accuracy of the gyrator action is relatively insensitive to changes in the circuit components or variations in environment, such as temperature, line voltage, etc.

These and other objects and advantages, the nature of the present invention, and its various features, will appear more fully upon consideration of the various illustrative embodiments now to be described in detail in connection with the accompanying drawings, in which.

Figure 1:
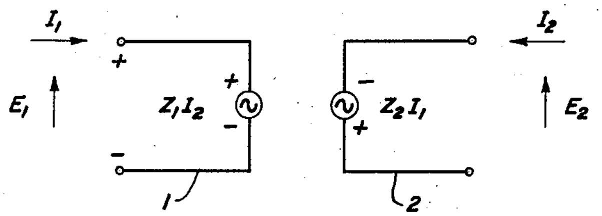
FIG. 1 is an equivalent circuit diagram of a gyrator.

Referring more specifically to FIG. 1, there is shown an equivalent circuit diagram of a gyrator. The circuit comprises two loops, 1 and 2, each of which ideally has zero open circuit self-impedance. Coupling between the two loops is provided by means of the transfer impedances $Z_1$ and $-Z_2$. Specifically, the coupling is in the form of an induced voltage in each of the loops which is proportional to the current in the other of the two loops.

To physically realize such a network, in accordance with the invention, several idealized circuit components are postulated. These include a voltage amplifier, and a current amplifier.

Figure 2A:
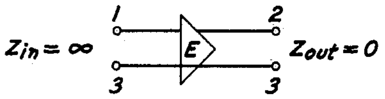
FIGS. 2A and 2B show, by way of illustration, an ideal voltage amplifier and a transistor equivalent circuit.

An idealized voltage amplifier, as contemplated by the invention, is shown symbolically in FIG. 2A. It has infinite input impedance, zero output impedance, a voltage gain of $k$ in the forward direction, and zero current gain in the reverse direction.

Figure 3A:
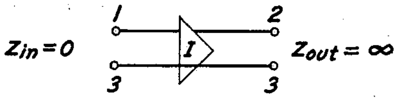
FIGS. 3A and 3B show, by way of illustration, an ideal current amplifier and a transistor equivalent circuit.

The idealized current amplifier, shown symbolically in FIG. 3A, has zero input impedance, infinite output impedance, a current gain of K in the forward direction and zero voltage gain in the reverse direction.

Both of these circuit components may be approximated, in general, by using any of the well known active circuit elements or combinations thereof. Because of the many advantages enjoyed by transistors, however, the various embodiments of the present invention will be illustrated using transistors as the active elements.

The transistor, ideally, may be regarded as a device whose collector and emitter currents are substantially equal, whose base current is zero (negligible with respect to the emitter or collector current), and whose emitter-to-base voltage is also negligibly small. To the extent that these assumptions depart from the ideal, the resulting amplifier circuits depart from the postulated ideal.

Figure 2B:
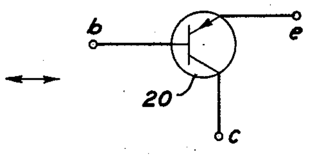

Based upon the above enumerated characteristics of the transistor, the voltage amplifier of FIG. 2A can be realized by the common collector connection of the transistor as shown in FIG. 2B. This equivalence, as indicated by the double arrow between FIG. 2A and FIG. 2B, is obtained by connecting the input between base terminal $b$ and collector terminal $c$ of transistor 20, and the output between emitter terminal $e$ and collector terminal $c$.

Figure 3B:
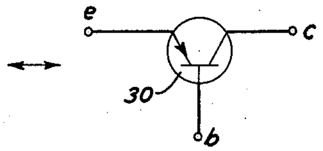

The current amplifier of FIG. 3A can be implemented as indicated in FIG. 3B, by means of the common base transistor connection. In this configuration, the input is between the emitter $e$ and base $b$ of transistor 30, and the output is between the collector $c$ and base $b$.

It should be noted that the voltage gain $k$ of the transistor voltage amplifier shown in FIG. 2B and the current gain K of the transistor current amplifier shown in FIG. 3B are both unity.

Figure 4:
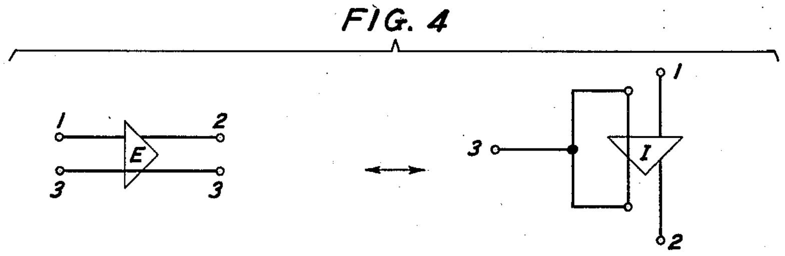
FIGS. 4 and 5 show, by way of illustration, the equivalence between the voltage amplifier of FIG. 2A and the current amplifier of FIG. 3A.

By comparing the circuits shown in FIGS. 2B and 3B, it is evident that the current amplifier of FIG. 3A may be obtained from the voltage amplifier of FIG. 2A by rearranging the input and output connections. For example, as illustrated in FIG. 4, the voltage amplifier of FIG. 2A is equivalent to the current amplifier of FIG. 3A, when the latter is connected so that the input is applied between terminals 3 and 2 and the output is taken across terminals 1 and 2.

Figure 5:
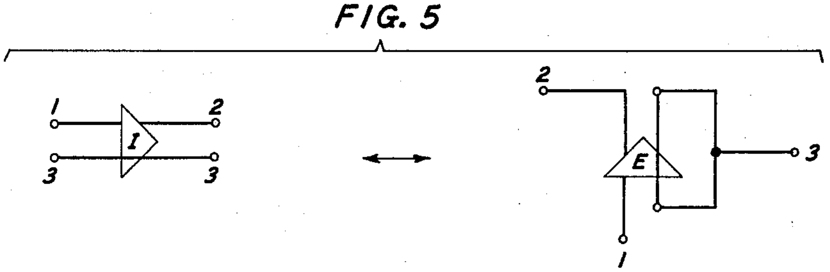

Conversely, by rearranging the connections to the voltage amplifier of FIG. 2A, the current amplifier of FIG. 3A is obtained. This is illustrated in FIG. 5. These equivalents will be used hereinafter to simplify the basic gyrator circuit.

It must be noted, however, that these equivalences are only true for amplifiers having voltage and current gains of unity. That is, where $k=K=1$.

Figure 6A:
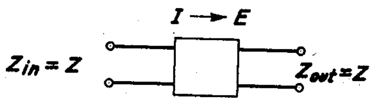
FIGS. 6A and 6B show, by way of illustration, a current-to-voltage transducer and a network equivalent.
Figure 6B:
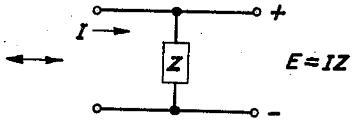

Two additional circuit elements should be briefly considered. The first of these is a current-to-voltage transducer, shown symbolically in FIG. 6A. This component has a finite open circuit input and output impedance of value Z which may be readily realized by means of a simple shunt impedance of value Z, as shown in FIG. 6B. Obviously, a current I applied at either pair of terminals will produce an open circuit output voltage E equal to IZ.

Figure 7A:
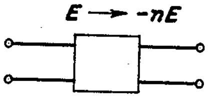
FIGS. 7A and 7B show, by way of illustration, a phase inverter and a network equivalent.
Figure 7B:
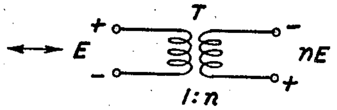

The second of these additional circuit components is a phase inverter shown in FIG. 7A. Phase inversion is readily obtained by means of the transformer T of FIG. 7B. By appropriately arranging the input and output terminals, a voltage E, applied across one pair, will produce a voltage $-nE$ across the other pair, where the turns ratio is $1:n$.

Figure 8:
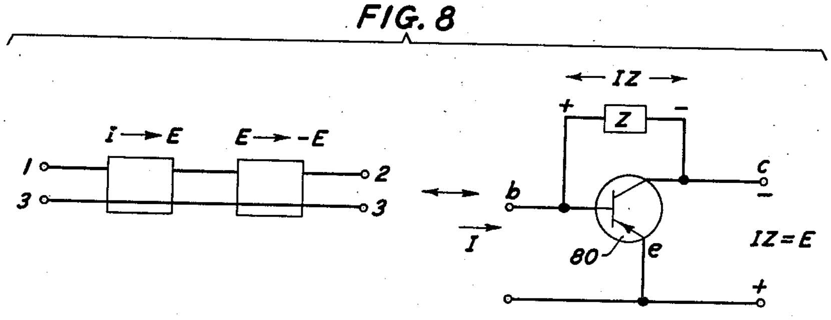
FIG. 8 shows, by way of illustration, a combined current-to-voltage transducer and phase inverter and a transistor equivalent circuit.

While a transformer is a reasonable phase inverter, the functions of the current-to-voltage transducer and the phase inverter can be combined in a single transistor. Such an arrangement is shown in FIG. 8 wherein transistor 80 is connected in a common emitter arrangement with an impedance Z connected between the base terminal $b$ and the collector terminal $c$. When a current I is applied to the base terminal, all of the current must flow through impedance Z since, as indicated above, the base current in an ideal transistor is zero. Current I, flowing through impedance Z, produces a voltage drop IZ between the base and the collector. Since the emitter-to-base voltage is negligible, this voltage drop also appears between the collector terminal $c$ and the emitter terminal $b$, as shown.

Figure 9:
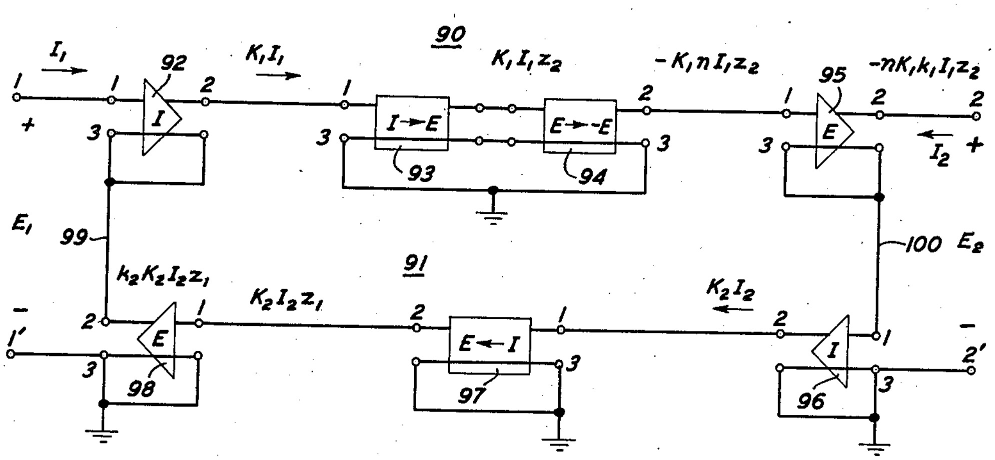
FIG. 9 shows, in block diagram, a gyrator circuit in accordance with the invention.

The gyrator represented by FIG. 1 can now be synthesized by a combination of the above four circuit elements in the manner shown in FIG. 9. The circuit essentially comprises two unilateral signal paths 90 and 91. Path 90 includes, in cascade, the current amplifier 92, the current-to-voltage transducer 93, the voltage phase inverter 94 and the voltage amplifier 95. The second path 91 includes, in cascade, the current amplifier 96, the current-to-voltage transducer 97 and the voltage amplifier 98. The two networks are interconnected at each end by serially connecting the input of path 90 to the output of path 91 by means of the connection 99. The remaining pair of terminals, 1—1′, form one port or one pair of terminals, of the gyrator. The other end of the two paths are similarly connected in series by means of the connector 100, with the remaining pair of terminals 2—2′ forming the other port of the gyrator.

In operation, a current $I_1$ is applied to terminal 1. This current passes through the serially connected current amplifier 92 and voltage amplifier 98, to produce an output current, $K_1I_1$, in the output of current amplifier 92 in path 90. The input current $I_1$, however, does not energize path 91 since the voltage amplifier 98 is a unilateral device having zero current gain in the reverse direction.

Current $K_1I_1$ is transformed into a voltage $K_1L_1z_2$ by means of the current-to-voltage transducer 93, which voltage is, in turn, inverted to $-nK_1I_1z_2$ by means of the voltage phase inverter 94. The inverted signal is then applied across the input of the voltage amplifier 95 and the input of the serially connected current amplifier 96. Since the input impedance to amplifier 96 is zero, the total voltage $E_2$ equal to $-nk_1K_1z_2I_1$ appears across the gyrator terminals 2—2′.

For transmission in the opposite direction, a signal current $I_2$ is applied to terminal 2. The current passes through the output terminals of voltage amplifier 95 and the input terminals of current amplifier 96. The former is not sensitive to this signal and consequently path 90 is not activated. The current amplifier 96, however, does respond and produces a current $K_2I_2$ at the output of current amplifier 96 in path 91. This current is transformed into a voltage $K_2z_1I_2$ in transducer 97 which, in turn, is applied to voltage amplifier 98. The resulting output voltage $K_2k_2z_1I_2$ appears across the output terminals 1—1′ since the input impedance-to-current amplifier 92 is zero.

Based upon the assumptions made regarding the properties of the components shown in FIGS. 2A, 3A, 6A and 7A, the network is seen to have the properties of the ideal gyrator. For example, the open-circuit input, or self impedance of the network, as viewed at either end 1—1′ or 2—2′ is zero, since it was postulated that the input impedance of the current amplifier and the output impedance of the voltage amplifier are both zero. The open-circuit transfer impedance, or the ratio of the output voltage to the input current, in the direction from terminals 1—1′ to terminals 2—2′, is seen to be $+E_2/I_1$ equal to $-nk_1K_1z_2=-Z_2$, whereas the transfer impedance in the reverse direction is $E_1/I_2$ equal to $k_2K_2z_1=Z_1$.

Figure 10:
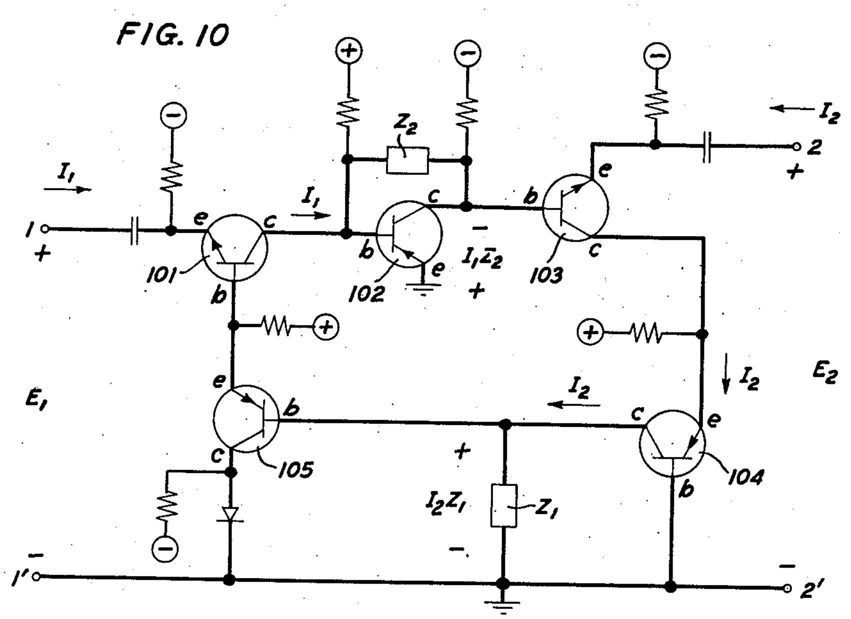
FIG. 10 is a transistorized embodiment of the gyrator circuit of FIG. 9.

By substituting the transistor equivalents of the several network functions utilized in FIG. 9, a transistorized gyrator circuit is obtained. Such a circuit is shown in FIG. 10.

Starting at the terminals 1—1′, the first transistor 101 in the upper path is connected in the common base configuration of FIG. 3B and corresponds to the current amplifier 92 of FIG. 9. Transistor 102, connected in the common emitter configuration, and having the impedance $Z_2$ connected between its collector terminal *c* and base terminal *b* corresponds to the combined current-to-voltage transducer and phase inverter of FIG. 8 and represents the corresponding units 93 and 94 of FIG. 9. Transistor 103, connected in the common collector arrangement of FIG. 2B, represents the voltage amplifier 95.

In the reverse direction, starting from terminals 2—2′, transistor 104, connected in the common base configuration of FIG. 3B, represents the current amplifier 96; impedance $Z_1$ comprises the current-to-voltage converter of the type shown in FIG. 6B; while transistor 105, connected in the common collector configuration represents voltage amplifier 98.

In operation, a current $I_1$ is applied at terminal 1 and enters the emitter *e* of transistor 101. Since the base current is negligible, an equal current $I_1$ is caused to flow in the collector circuit of transistor 101. Transistor 102 and impedance $Z_2$ convert current $I_1$ to a voltage $-I_1Z_2$, which appears between collector *c* and emitter *e* (which returns to a common junction or ground) of transistor 102. Voltage $-I_1Z_2$ also is impressed between the base *b* of transistor 103 and the base *b* of transistor 104, the latter base being connected to the common junction. However, since the emitter-to-base voltage for both transistors is substantially zero, voltage $-I_1Z_2$ also appears between terminals 2—2′ as output voltage $E_2=-I_1Z_2$.

In the reverse direction, a current $I_2$ is applied from terminal 2 to the emitter *e* of transistor 103. Since the base current in transistor 103 is substantially zero, all of the current is applied to the emitter of the current amplifier 104. Having a current gain of unity, an equal current leaves the collector and passes through impedance $Z_1$ (since the base current for transistor 105 is zero) producing a voltage $I_2Z_1$, which in turn is impressed between base *b* of transistor 105 and ground. Since the base-to-emitter voltage drops in transistors 105 and 101 are negligible, the voltage $E_1$ equal to $I_2Z_1$ is produced between terminals 1—1′.

It is evident from the description given of the operation of the transistor circuit of FIG. 10, that this circuit is capable of producing gyrator action.

Also shown in FIG. 10, but not identified, are the various resistors, diodes and capacitors with their associated direct current power sources for establishing the necessary operating biases in the several transistors.

The circuit of FIG. 10 can be simplified by combining certain of the circuit functions, as explained in connection with the discussion of FIGS. 4 and 5. For example, in FIG. 5 the equivalence between a suitably connected unity voltage amplifier and a unity current amplifier is shown. Specifically, it is shown that if the input current is applied to terminal 2 and the output taken at terminal 3, with 1 the common terminal, the voltage amplifier is equivalent to a current amplifier of the type postulated.

Figure 11:
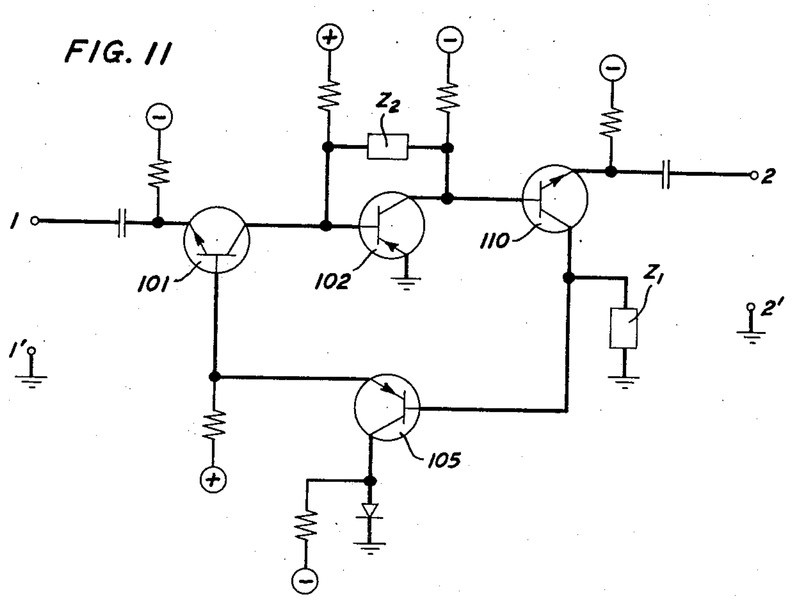
FIGS. 11, 12 and 13 are simplified circuits derived from the embodiment of FIG. 10.

It will now be noted in FIG. 9 that for transmission in the direction from terminals 2—2′ to terminals 1—1′, current $I_2$ is applied to terminal 2 of voltage amplifier 95 and the output taken from terminal 3. As regards transmission along path 91, voltage amplifier 95 is in the configuration shown in FIG. 5, and as such can perform the function of current amplifier 96 (provided $k=K=1$). Thus, in FIG. 10, the function of transistor 104 may be performed by transistor 103, since each has unity gain. That is, the voltage amplifier for path 90, and the current amplifier for path 91, may be combined in a single transistor. Such an arrangement is shown in FIG. 11 where, for transmission in the direction from terminals 1—1′ to 2—2′, transistor 110, connected in the common collector configuration, performs as a voltage amplifier, whereas for transmission in the direction 2—2′ to 1—1′, transistor 110 is in the common base configuration and performs the function of a current amplifier. The remaining transistors 101, 102 and 105 function as explained in connection with FIG. 10.

Figure 12:
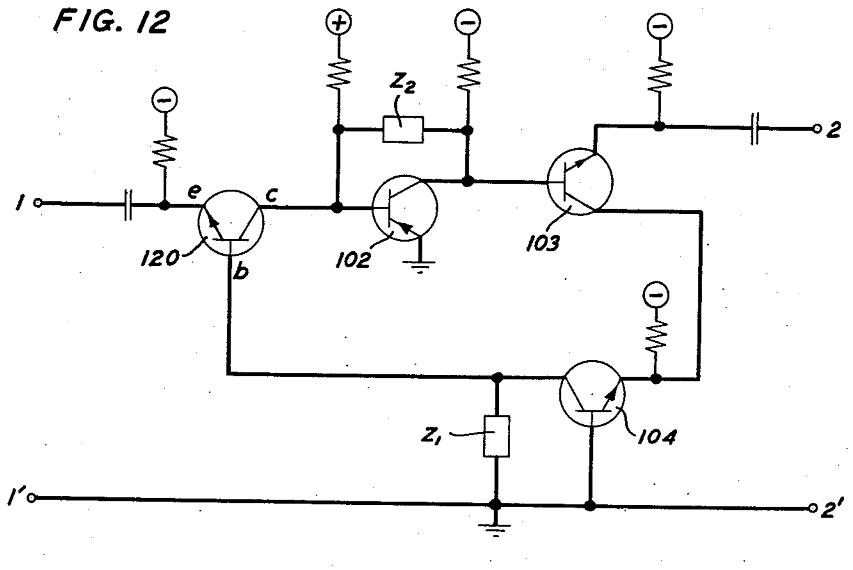

In FIG. 12 the functions of current amplifier 92 and voltage amplifier 98 of FIG. 9 have been consolidated into a single transistor 120. Thus, for transmission in the direction from 1—1′ to 2—2′, transistor 120 is in the common base configuration and functions as a current amplifier. For transmission in the direction 2—2′ to 1—1′, however, transistor 120 is in the common collector configuration of FIG. 2B and functions as a voltage amplifier. The remaining transistors, 102, 103 and 104 function as explained in connection with FIG. 10.

Figure 13:
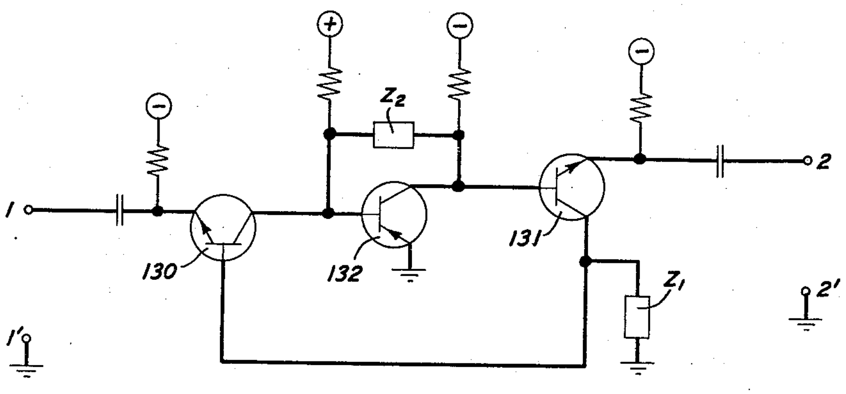

In FIG. 13, the two consolidations described above are combined to give a three transistor gyrator circuit. Transistors 130 and 131 perform the dual functions of voltage and current amplifier, with transistor 132 and impedance $Z_2$ comprising the current-to-voltage transducer and phase inverter functions for transmission from 1—1′ to 2—2′, and impedance $Z_1$ acting as a current-to-voltage transducer for transmission in the direction from 2—2′ to 1—1′.

Figure 14:
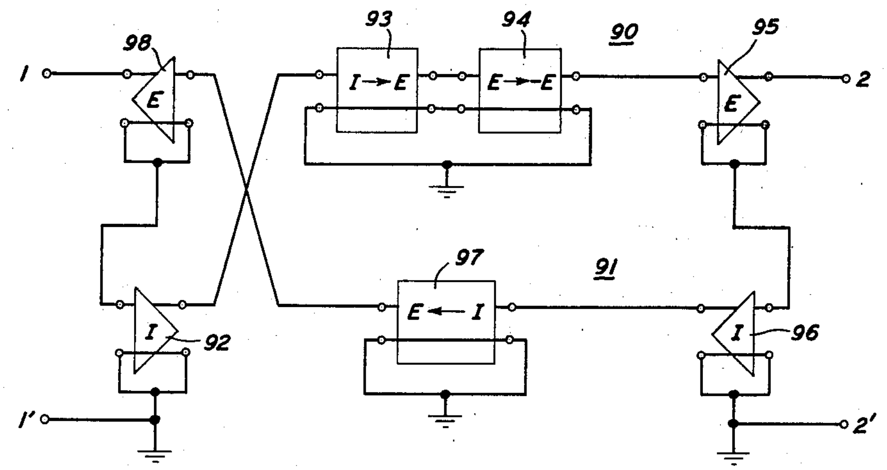
FIG. 14 shows, in block diagram, an alternate arrangement of the circuit of FIG. 9.

Some variations of the gyrator circuit shown in FIG. 9 may be indulged in which do not alter the basic circuit but which may possibly simplify the implementation of the circuit. Since the input and output stages of the two paths 90 and 91 are connected in series, there would appear to be no reason why voltage amplifier 98 could not be connected to terminal 1 and current amplifier 92 connected to terminal 1′ without in any way adversely affecting the operation of the circuit. Such an arrangement is shown in FIG. 14 where the relative positions of current amplifier 92 in path 90 and voltage amplifier 98 in branch 91 are interchanged with respect to terminals 1—1′. All of the other circuit components remain in the same relative positions. (The numerical designations of FIG. 9 are used in FIG. 14 to simplify comparisons between the two figures.)

Figure 15:
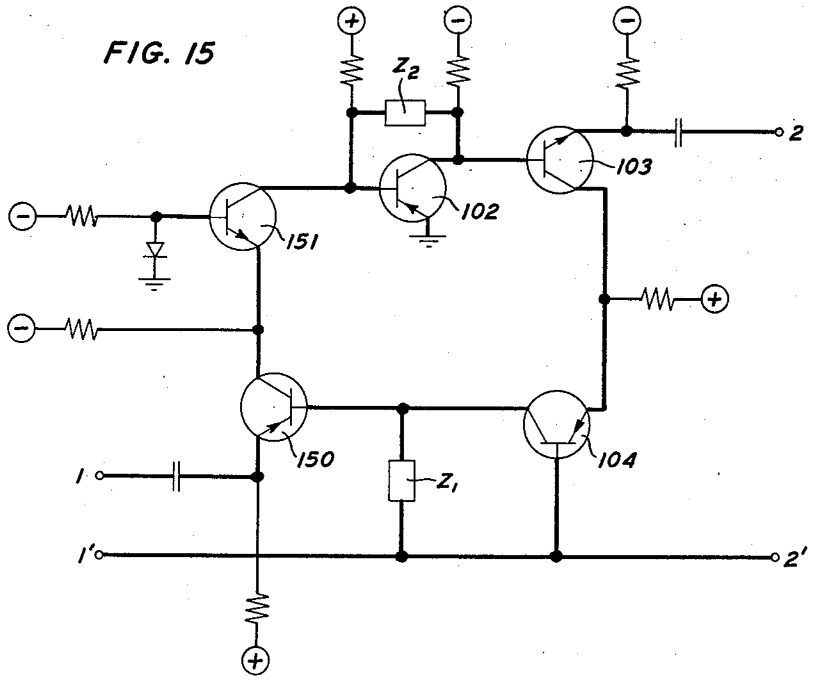
FIG. 15 is a transistorized embodiment of the gyrator circuit of FIG. 14.

FIG. 15 shows the transistorized version of the circuit of FIG. 14, wherein transistor 150 corresponds to the voltage amplifier 98 of FIG. 14 and transistor 151 corresponds to current amplifier 92. The remaining components function as they do in the circuit of FIG. 10.

Figure 16:
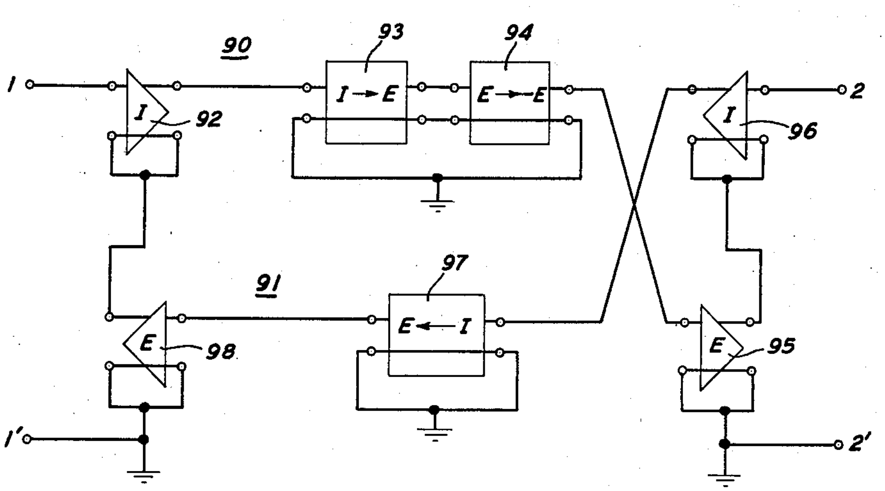
FIG. 16 shows, in block diagram, a second alternate arrangement of the circuit of FIG. 9.
Figure 17:
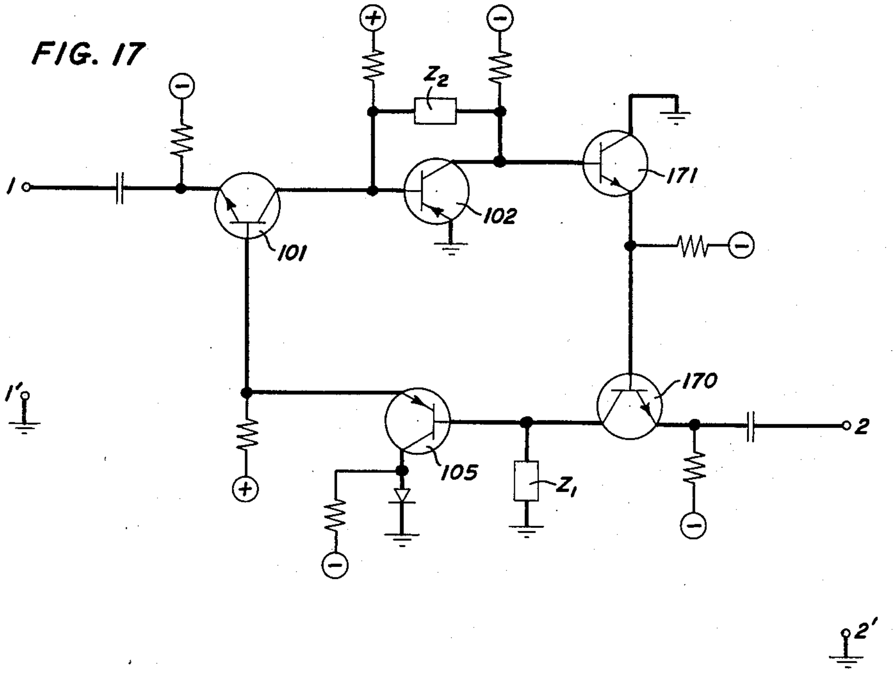
FIG. 17 is a transistorized embodiment of the gyrator circuit of FIG. 16.

Similarly, the positions of amplifiers 95 and 96 could be reversed relative to terminals 2—2′, as shown in FIG. 16, to give the transistor circuit of FIG. 17 in which transistor 170 corresponds to current amplifier 96 and transistor 171 corresponds to voltage amplifier 95.

As before, the basic circuits of FIGS. 15 and 17 may be simplified by combining circuit functions as was explained hereinbefore with reference to FIGS. 11, 12 and 13.

In the various illustrative embodiments of the invention described, both n-p-n and p-n-p type transistors were used. The intermingling of both types of transistors within any one network was merely an expedient for simplifying the biasing arrangements. Obviously, by making the necessary changes in the biasing circuits, one or the other of the two types of transistors could be used exclusively.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A nonreciprocal signal translating network comprising two signal paths, the input circuit of one of said paths being serially connected to the output circuit of the other of said paths, the input circuit of the other of said paths being serially connected to the output circuit of said one path, said one path comprising in cascade a unity-gain current amplifier, a current-to-voltage transducer, a phase inverter and a unity-gain voltage amplifier, said other path comprising a current-to-voltage transducer, means for connecting a signal source across one of said serially connected input and output circuits, and means for connecting signal utilization means across the other of said serially connected input and output circuits.

2. The network according to claim 1 wherein the current-to-voltage transducer and phase inverter of said one path comprise a single stage.

3. A nonreciprocal signal translating network comprising two signal paths, the input circuit of one of said paths being serially connected to the output circuit of the other of said paths, the input circuit of the other of said paths being serially connected to the output circuit of said one path, said one path comprising in cascade a current amplifier, a current-to-voltage transducer, a phase inverter and a voltage amplifier, said other path comprising in cascade a current amplifier, a current-to-voltage transducer and a voltage amplifier, means for connecting a signal source across one of said serially connected input and output circuits, and means for connecting signal utilization means across the other of said serially connected input and output circuits.

4. The network according to claim 3 wherein the current-to-voltage transducer and phase inverter of said one path comprise a single stage.

5. A gyrator comprising, in combination, a plurality of transistors each having a semiconductor body, an emitter, a collector and a base electrode in contact with said body, means for connecting the collector of a first transistor to the base of a second transistor, means for connecting the collector of said second transistor to the base of a third transistor, means for connecting the collector of said third transistor to the emitter of a fourth transistor, means for connecting the collector of said fourth transistor to the base of a fifth transistor, means for connecting the emitter of said fifth transistor to the base of said first transistor, means for connecting the emitter of said second transistor, the base of said fourth transistor and the collector of said fifth transistor to a common terminal, means for connecting a first impedance $Z_1$ from the collector of said fourth transistor to said common terminal, means for connecting a second impedance $Z_2$ from the collector of said second transistor to the base of said second transistor, means for connecting an input circuit between the emitter of said first transistor and said common terminal, means for connecting an output circuit between the emitter of said third transistor and said common terminal and means for applying bias to said transistors.

6. A gyrator comprising, in combination, a plurality of transistors each having a semiconductor body, an emitter, a collector and a base electrode in contact with said body, means for connecting the collector of a first transistor to the base of a second transistor, means for connecting the collector of said second transistor to the base of a third transistor, means for connecting the collector of said third transistor to the base of a fourth transistor, means for connecting the emitter of said fourth transistor to the base of said first transistor, means for connecting the emitter of said second transistor and the collector of said fourth transistor to a common terminal, means for connecting a first impedance $Z_1$ from the collector of said third transistor to said common terminal, means for connecting a second impedance $Z_2$ from the collector of said second transistor to the base of said second transistor, means for connecting an input circuit between the emitter of said first transistor and said common terminal, means for connecting an output circuit between the emitter of said third transistor and said common terminal, and means for applying bias to said transistors.

7. A gyrator comprising, in combination, a plurality of transistors each having a semiconductor body, an emitter, a collector and a base electrode in contact with said body, means for connecting the collector of a first transistor to the base of a second transistor, means for connecting the collector of said second transistor to the base of a third transistor, means for connecting the collector of said third transistor to the emitter of a fourth transistor, means for connecting the collector of said fourth transistor to the base of said first transistor, means for connecting the emitter of said second transistor and the base of said fourth transistor to a common terminal, means for connecting a first impedance $Z_1$ from the collector of said fourth transistor to said common terminal, means for connecting a second impedance $Z_2$ from the collector of said second transistor to the base of said second transistor, means for connecting an input circuit between the emitter of said first transistor and said common terminal, means for connecting an output circuit between the emitter of said third transistor and said common terminal, and means for applying bias to said transistors.

8. A gyrator comprising, in combination, a plurality of transistors each having a semiconductor body, an emitter, a collector and a base electrode in contact with said body, means for connecting the collector of a first transistor to the base of a second transistor, means for connecting the collector of said second transistor to the base of a third transistor, means for connecting the collector of said third transistor to the base of said first transistor, means for connecting the emitter of said second transistor to a common terminal, means for connecting a first impedance $Z_1$ from the collector of said third transistor to said common terminal, means for connecting a second impedance $Z_2$ from the collector of said second transistor to the base of said second transistor, means for connecting an input circuit between the emitter of said first transistor and said common terminal, means for connecting an output circuit between the emitter of said third transistor and said common terminal, and means for applying bias to said transistors.

9. A gyrator comprising, in combination, a plurality of transistors each having a semiconductor body, an emitter, a collector and a base electrode in contact with said body, means for connecting the collector of a first transistor to the base of a second transistor, means for connecting the collector of said second transistor to the base of a third transistor, means for connecting the collector of said third transistor to the emitter of a fourth transistor, means for connecting the collector of said fourth transistor to the base of a fifth transistor, means for connecting the collector of said fifth transistor to the emitter of said first transistor, means for connecting the base of said first transistor, the emitter of said second transistor and the base of said fourth transistor to a common junction, means for connecting a first impedance $Z_1$ from the collector of said fourth transistor to said common junction, means for connecting a second impedance $Z_2$ from the collector of said second transistor to the base of said second transistor, means for connecting an input circuit between the emmiter of said fifth transistor and said common junction, means for connecting an output circuit between the emitter of said third transistor and said common junction, and means for applying bias to said transistors.

10. A gyrator comprising, in combination, a plurality of transistors each having a semiconductor body, an emitter, a collector, and a base electrode in contact with said body, means for connecting the collector of a first transistor to the base of a second transistor, means for connecting the collector of said second transistor to the base of a third transistor, means for connecting the emitter of said third transistor to the base of a fourth transistor, means for connecting the collector of said fourth transistor to the base of a fifth transistor, means for connecting the emitter of said fifth transistor to the base of said first transistor, means for connecting the emitter of said second transistor, the collector of said third transistor and the collector of said fifth transistor to a common terminal, means for connecting a first impedance $Z_1$ from the collector of said fourth transistor to said common terminal, means for connecting a second impedance $Z_2$ from the collector of said second transistor to the base of said second transistor, means for connecting an input circuit between the emitter of said first transistor and said common terminal, means for connecting an output circuit between the emitter of said fourth transistor and said common terminal, and means for applying bias to said transistors.

References Cited in the file of this patent

UNITED STATES PATENTS

| | | |
|---|---|---|
| 2,273,997 | Rubin | Feb. 24, 1942 |
| 3,001,157 | Sipress et al. | Sept. 19, 1961 |